United States Patent [19]

Dolk et al.

[11] 4,112,152

[45] Sep. 5, 1978

[54] METHOD FOR MANUFACTURING POLYURETHANE FILMS AND SURFACE COATINGS FROM TALL OIL PITCH

[76] Inventors: Matti Dolk, Metsäpurontie 17 E 69, Helsinki; Väinö Erä, Suvantopolku 5 E, Myyrmäki; Jarl Johan Lindberg, Ukonkivenpolku 1 G, Helsinki, all of Finland

[21] Appl. No.: 673,341

[22] Filed: Apr. 2, 1976

[51] Int. Cl.$^2$ .................. B05D 3/02; B32B 15/08
[52] U.S. Cl. .................. 427/385 R; 260/18 TN; 260/28 R; 260/97.5; 528/74; 427/388 A
[58] Field of Search ......... 260/97.5, 18 TN, 77.5 AN, 260/28 R; 427/385 R, 388 A; 428/425

[56] References Cited

U.S. PATENT DOCUMENTS

| | | | |
|---|---|---|---|
| 2,993,813 | 7/1961 | Tischbein | 427/388 A |
| 3,242,126 | 3/1966 | Rickert | 260/77.5 AN |
| 3,245,960 | 4/1966 | Curtis | 427/388 A |
| 3,248,348 | 4/1966 | Piechota et al. | 260/97.5 |
| 3,248,349 | 4/1966 | Szabat et al. | 260/97.5 |
| 3,372,083 | 3/1968 | Evans et al. | 260/97.5 X |
| 3,398,106 | 8/1968 | Hostettler et al. | 260/18 TN |

FOREIGN PATENT DOCUMENTS

| | | | |
|---|---|---|---|
| 1,104,442 | 2/1968 | United Kingdom | 260/77.5 AN |
| 1,038,009 | 8/1966 | United Kingdom | 260/77.5 AN |

*Primary Examiner*—Harry J. Gwinnell
*Attorney, Agent, or Firm*—Finnegan, Henderson, Farabow & Garrett

[57] ABSTRACT

Method for manufacturing polyurethane films and surface coatings from tall oil pitch. Tall oil pitch with an acid number of about 30-60 and a hydroxyl number of about 60-90 is esterified by adding about 5-15 weight fractions of an aliphatic alcohol comprising at least three OH-groups and about 0.1-0.5 weight fractions preferably p-toluenesulphonic acid per 100 weight fractions tall oil pitch, and by heat treatment at a lowered pressure until the acid number of the mixture is about 5-35 and the hydroxyl number is about 200-350. Aliphatic triisocyanate preferably dissolved in an inert organic solvent is added to the tall oil pitch ester thus attained in an amount such that the amount of isocyanate groups is 10-35 weight fractions per 100 weight fractions tall oil pitch ester. To the mixture thus attained is added known dilution agents and additives; the mixture is spread on a base material in a known way and the film or surface coating is finally polymerized at room temperature or at higher temperatures.

6 Claims, No Drawings

METHOD FOR MANUFACTURING POLYURETHANE FILMS AND SURFACE COATINGS FROM TALL OIL PITCH

Plenty of literature concerning polyurethanes and their manufacture can be found. It is known that coal tar can be added to polyurethane either during the polymerization or after it, whereby mixtures for surface coatings are achieved (British Pat. No. 1,104,442). It is also known that a pitchlike or tarlike substance, such as tall oil pitch, can be caused to react with polyisocyanate, so that an intermediate product is attained that is suitable to be used as one component of a seaming agent (U.S. Pat. No. 3,372,083). Intermediate foamy plastic products can be made either by causing polyisocyanate to react with a reactive organic substance, as pitch or tar (British Pat. No. 1,038,009), or by causing tall oil to react with diethanol amine and polyisocyanate (DOS No. 2,239,235). A special method for manufacturing polyurethane surface coatings from maleic or fumaric acid derivatives of tall oil pitch or from its epoxy derivative, polyol or polyisocyanate, is also known (Japanese appl. No. 72 14,279, published Apr. 27, 1972).

Tall oil pitch is produced as a distillation residue upon refining crude tall oil. In Finland tall oil distilleries produce about 10,000 tons a year. Pitch can be utilized for various purposes, but the main part of it is mixed with fuel oil and burned.

Tall oil pitch includes the resinous and fatty acids and the unsaponified components of crude tall oil. For the method according to this invention the most important components are various hydroxyl compounds reacting with isocyanates, whereby polyurethanes are formed. Concentration of the hydroxyl groups reacting with isocyanates can substantially be increased by allowing the reaction of tall oil pitch with multiple- valued alcohols at higher temperatures and lowered pressures in the presence of a catalyst. For the method according to this invention it is advantageous to use tall oil pitch esters as the reacting component in the manufacture of polyurethanes. The economy of the method is supported by the fact that the tall oil pitch esters replace the polyesters commonly used in mixtures.

Tall oil pitch can be characterized by the following key numbers: softening point (40°-55° C.), acid number (30-60 mg KOH/g), saponification number (mg KOH/g) and hydroxyl number (60-90 mg KOH/g). The hydroxyl number is the most important of these key numbers, because on it the reactivity of tall oil pitch is estimated and the amount of isocyanate to be added in esterified tall oil pitch calculated.

By the method according to the invention hard and soft plastic products, as films and surface coatings resistant to corrosion and chemicals, can be manufactured.

Polyurethane films produced by the method according to the invention are transparent and ligh-coloured and they can easily be dyed.

This is surprising, for the original substance, tall oil pitch, is dark in color.

The characteristics of polyurethane films produced by the method according to the invention are as follows:

(a) It was found in dissolution tests that polyurethane films were practically insoluble in the following solvents: xylene, benzene, chloroform, dichlorobenzene, diethyl ether, ethyl acetate, methylethyl ketone, methylene chloride, dioxane, acetone, ethanol and water.

(b) Results from heat tests performed by calorimeter indicate that the polyurethane films of the invention can endure heat up to +240° C. Above this temperature decomposition takes place.

EXAMPLE 1

Manufacture of Polyurethane Film (a) Manufacture of tall oil pitch ester 300 g tall oil pitch with an acid number of 56 and an hydroxyl number of 88 was added to the reaction vessel. The mixture was heated to +100° C. in vacuum for about half an hour and nitrogen flow was directed to it. Thereafter 30 g glycerol and 0.3 g p-toluenesulphonic acid were added and the mixture was boiled for 5 hours at +200° in a vacuum. The acid number of the tall oil pitch ester attained was 22 and the hydroxyl number 240.

(b) Manufacture of tall oil pitch ester - isocyanate mixture 109 g "Desmodur N" - solution was added to 100 g tall oil pitch ester manufactured according to the section a) ("Desmodur N" is a commercially available biuret-type of aliphatic tri-isocyanate marketed by Farbenfabriken Bayer A. G., having the following formula, as disclosed in U.S. Pat. No. 3,124,605, issued Mar. 10, 1964:

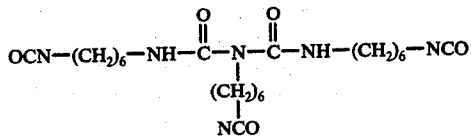

"Desmodur N" has an NCO-content of 16.5%, a dry solids content of 75%, and the solvent contains ethylene glycol acetate and xylene in a 1 to 1 ratio. The mixture attained was diluted with ethyl acetate to a suitable consistency for the manufacture of films.

(c) Manufacture of film

Tall oil pitch ester - isocyanate mixture produced in the afore-mentioned way was applied by scraper to aluminium plates and allowed to dry at room temperature for 3 days. The film thus attained was yellow in color and transparent.

EXAMPLE 2.

Manufacture of Polyurethane Film (a) Tall oil pitch ester was manufactured as in the example 1 except that the boiling lasted for 5 hours at 250° C. The acid number of the tall oil pitch ester attained was 11 and the hydroxyl number was 298.

(b) Procedure as in the example 1 except that 135 g "Desmodur N" solution was added to 100 g tall oil pitch ester produced by the section (a).

(c) Procedure as in the example 1.

EXAMPLE 3

Manufacture of Polyurethane Film (a) Tall oil pitch ester was manufactured as in the example 1 except that the boiling was performed with 15 g pentaerythritol and lasted for 5 hours at 220° C. The acid number of the tall oil pitch ester attained was 33 and the hydroxyl number was 313.

(b) Procedure as in the example 1 except that 143 g "Desmodur N" solution was added to 100 g tall oil pitch ester produced by the section (a).

(c) Procedure as in the example 1.

EXAMPLE 4

Manufacture of Polyurethane Film (a) Tall oil pitch ester was manufactured as in the example 1 except that the boiling was performed with 15 g pentaerythritol and it lasted for 5 hours at 280° C. The acid number of the tall oil pitch ester attained was 15 and the hydroxyl number was 274.

(b) Procedure as in the example 1 except that 124 g "Desmodu N" solution was added to 100 g tall oil pitch ester produced by the section (a).

(c) Procedure as in the example 1.

Tension strengths were determined by the Instron-device using sample strips cut from the film. Results are shown in the table 1.

Table 1

| Tension strength values of polyurethane films. | | | |
|---|---|---|---|
| Tall oil pitch ester, g | | Desmondurn, g | Tension strength, kp/cm² |
| Example | 1 | 100 | 109 | 266 |
| | 2 | 100 | 135 | 261 |
| | 3 | 100 | 143 | 182 |
| | 4 | 100 | 124 | 188 |

The results indicate that the tension strength values of polyurethane films are in the same order as those of polyethenes and softened PVC commonly used as film materials. It can be mentioned, that the tension strength of high pressure polyethene and softened PVC is about 100 kp/cm² and of low pressure polyethene about 250 kp/cm². The abbreviation "kp" stands for kilopond, a unit of force equal to 9.81 Newtons.

EXAMPLE 5

Manufacture of Polyurethane Film

Procedure as in the example 1, but in the phase b) a softener, dioctylphtalate (DOP), was added, which has an influence on the strength characteristics of films. Results are shown in the table 2.

Table 2

| Influence of a softner to the strength characteristics of polyurethane surface coatings. | | | |
|---|---|---|---|
| Tall oil pitch ester, g | Desmodur N, g | DOP, g | Tension strength kp/cm² |
| 100 | 113 | 0 | 150 |
| 100 | 113 | 19 | 110 |
| 100 | 113 | 39 | 80 |

The results indicate that the strength characteristics of polyurethane surface coatings can be modified by a softener.

EXAMPLE 6

Manufacture of Colored Polyurethane Surface Coating

Procedure as in the example 1, but in the phase (b) a softener and a coloring agent were added. The composition of the mixture to be polymerized was the following:

| | |
|---|---|
| Tall oil pitch ester | 100 g |
| "Desmodur N" | 210 g |
| Dioctylphtalate | 23 g |
| "Mikrolith G-K" (a commerical coloring agent available from Ciba-Geigy AG, Basel, Switzerland). | 10 g |

A clear, green coating was attained with good tension strength characteristics.

We claim:

1. A method for manufacturing polyurethane films and surface coatings from tall oil pitch having an acid number of about 30–60 and an hydroxyl number of about 60–90, comprising:
    (a) esterifying the tall oil pitch by adding to the tall oil pitch about 5–15 weight fractions of an aliphatic alcohol comprising at least three OH-groups, and about 0.1–0.5 weight fractions p-toluene sulfonic acid per 100 weight fractions tall oil pitch, and by heat treating at less than atmospheric pressure until the acid number of the mixture is about 5–35 and the hydroxyl number is about 200–350,
    (b) adding an aliphatic tri-isocyanate preferably dissolved in an inert organic solvent, to the tall oil pitch ester thus attained in the amount such that the amount of isocyanate groups is 10–35 weight fractions per 100 weight fractions tall oil pitch ester,
    (c) diluting the resultant mixture to a suitable consistency for the manufacture of films,
    (d) spreading the resultant diluted mixture on a suitable base material, and
    (e) polymerizing the resultant diluted mixture on the base material.

2. A method according to claim 1, wherein the aliphatic alcohol added to the tall oil pitch is selected from the group consisting of glycerol and pentaerytritol.

3. A method according to claim 2, wherein the aliphatic alcohol is added to the tall oil pitch in an amount of from about 5–10 weight fractions.

4. A method according to claim 3, wherein the diluted mixture on the base material is polymerized at about room temperature for about 1–3 days.

5. A method according to claim 4, wherein the diluted mixture on the base material is polymerized at 100° C. for about 1–10 hours.

6. A method for manufacturing polyurethane films and surface coatings from tall oil pitch having an acid number of about 30–60 and an hydroxyl number of about 60–90, comprising:
    (a) esterifying the tall oil pitch by adding to the tall oil pitch about 5–10 weight fractions of an aliphatic alcohol selected from the group consisting of glycerol and pentaerytritol and about 0.1–0.5 weight fractions p-toluene sulfonic acid per 100 weight fractions tall oil pitch, and by heat treating at less than atmospheric pressure until the acid number of the mixture is about 5–35 and the hydroxyl number is about 200–350,
    (b) adding to the resultant tall oil pitch ester a buiret-type tri-isocyanate dissolved in an organic solvent, said tri-isocyanate having the following formula:

$$OCN-(CH_2)_6-NH-\underset{\underset{NCO}{\overset{|}{(CH_2)_6}}}{\overset{\overset{O}{\parallel}}{C}}-N-\overset{\overset{O}{\parallel}}{C}-NH-(CH_2)_6-NCO$$

(c) diluting the resultant mixture to a suitable consistency for the manufacture of films,
   (d) spreading the resultant diluted mixture on a suitable base material, and
   (e) polymerizing the resultant diluted mixture on the base material.